United States Patent
Gu

(10) Patent No.: US 8,212,923 B2
(45) Date of Patent: Jul. 3, 2012

(54) SECAM LINE IDENTIFICATION AND PAL SWITCH

(75) Inventor: Yongru Gu, Lake Forest, CA (US)

(73) Assignee: Newport Media, Inc., Lake Forest, CA (US)

( * ) Notice: Subject to any disclaimer, the term of this patent is extended or adjusted under 35 U.S.C. 154(b) by 351 days.

(21) Appl. No.: 12/759,669

(22) Filed: Apr. 13, 2010

(65) Prior Publication Data
US 2011/0249182 A1    Oct. 13, 2011

(51) Int. Cl.
*H04N 9/47* (2006.01)
*H04N 9/465* (2006.01)
(52) U.S. Cl. .................................. 348/504; 348/509
(58) Field of Classification Search .......... 348/503–509, 348/558; *H04N 5/46, 9/47, 9/45, 9/455, H04N 9/465*
See application file for complete search history.

(56) References Cited

U.S. PATENT DOCUMENTS

| | | | | |
|---|---|---|---|---|
| 5,500,739 A | * | 3/1996 | Strolle et al. | 348/638 |
| 6,725,463 B1 | * | 4/2004 | Birleson | 348/558 |
| 7,365,796 B1 | * | 4/2008 | Woodall | 348/508 |

* cited by examiner

*Primary Examiner* — Sherrie Hsia
(74) *Attorney, Agent, or Firm* — Rahman LLC

(57) ABSTRACT

SECAM line identification in an analog television includes an accumulator that accumulates a FM demodulated output corresponding to a color reference tone for each SECAM line; a first leakage average filter receiving a first result from the accumulator; a second leakage average filter receiving a second result from the accumulator; and a line decision block comparing the first result and the second result. An apparatus for soft-decision based PAL switch detection in an analog television includes a burst locked oscillator (BLO) receiving a composite video signal as input and producing an instantaneous PAL switch signal for each line; a leakage average filter receiving the PAL switch signal and filtering noise from an output received from the BLO; and a switch detection block receiving a filtered output from the leakage average filter, and making a decision based on a sign of the filtered output of the leakage average filter.

20 Claims, 6 Drawing Sheets

SECAM LINE IDENTIFICATION AND PAL SWITCH

BACKGROUND

1. Technical Field

The embodiments herein generally relate to analog television systems, and, more particularly, to a reliable SECAM line identification and PAL switch for analog television.

2. Description of the Related Art

Séquentiel couleur à mémoire (SECAM) (Sequential Color with Memory) is a standard for analog color television systems that is also compatible with monochrome television receivers predating its introduction. Because of this compatibility requirement, a second signal is added to the basic monochrome signal, and this signal carries the color information, called chrominance or C in short. SECAM uses frequency modulation (FM) to encode chrominance information on the sub carrier. In color television systems based on SECAM, blue color information and red color information are modulated with two separate color sub-carrier tones. Instead of transmitting the red and blue information together, it only sends one of them at a time, and uses the information about the other color from the preceding line. It uses an analog memory device called a delay line to store one line of color information.

The blue color information and red color information are transmitted in alternate lines. For example, the first line may transmit blue color information, the second line transmits red color information, the third blue, the fourth red, and so on. Alternatively, the order of the blue and red can be swapped. Blue color is modulated with a color sub-carrier tone at 4.25 MHz, while the red color is modulated with a tone at 4.40625 MHz. Also, for each line, there is a color reference sub-carrier tone along with the regular video signal. For a line with blue color information, the color reference sub-carrier tone of that line has the same frequency as the tone used to modulate the blue color information, which is 4.25 MHz. For a line with red color information, the color reference sub-carrier tone of that line has the same frequency as the tone used to modulate the red color information, which is 4.40625 MHz. To detect whether a line carries blue or red color information, one needs to detect whether the reference tone of that line is 4.25 MHz or 4.40625 MHz.

To decode the color information, an FM modulator is used. In an ideal case, for a pure reference tone, the output of the FM modulator will be a DC level. The level of the DC signal for a tone with a higher frequency will be higher than the level of the DC signal for a tone with a lower frequency. Thus, for SECAM, the DC signal corresponding to the red color line will be higher than corresponding to the blue color line. Based on this property, one can know whether a line carries blue color information or red color information.

The process used to decide whether a line carries red or blue color information is called SECAM line identification. In a noisy channel, the FM output corresponding to the reference tone could be very noisy and could result in bad line identification, thus leading to color distortion of the pictures.

Phase Alternating Line (PAL) is another standard for color television broadcasting. In this standard, the color information on the video signal is reversed with each line. In the receiver side, one must correct this reversed phase. The process of detecting and correcting the phase is called PAL switch. Traditional PAL switching techniques are based on a hard decision from the phase detector of the burst locked oscillator in the receiver. In the noisy channel, it is easy to suffer errors and leads to color shift and distortion.

SUMMARY

In view of the foregoing, an embodiment herein provides an apparatus for performing SECAM line identification in an analog television, wherein the SECAM line comprises one of a red line and a blue line, the apparatus comprising an accumulator that accumulates a frequency modulation (FM) demodulated output corresponding to a color reference tone for each SECAM line; a first leakage average filter operatively connected to the accumulator, wherein the first leakage average filter receives a first result from the accumulator; a second leakage average filter operatively connected to the accumulator, wherein the second leakage average filter receives a second result from the accumulator; and a line decision block that compares the first result of the first leakage average filter and the second result of the second leakage average filter, wherein when there is a change between a relative magnitude of the first leakage average filter and the second leakage average filter, the line decision block issues a switch command to the first leakage average filter and the second leakage average filter, and switches a stored values between the first leakage average filter and the second leakage average filter.

Preferably, the first leakage average filter and the second leakage average filter are interconnected to each other. In one embodiment, before a time n, a value of the first leakage average filter is greater than a value of the second leakage average filter, and at the time n, a value of the first leakage average filter is less than a value of the second leakage average filter. The apparatus further comprises a LUMA remove filter that filters a composite video signal; and a FM demodulator operatively connected to the LUMA remove filter and the accumulator. The apparatus further comprises a horizontal and vertical synchronization block that takes the composite video signal and generates a burst gate signal for the accumulator. The analog television may comprise a mobile handheld device.

Another embodiment provides a method of performing SECAM line identification in an analog television, wherein the SECAM line comprises one of a red line and a blue line, the method comprising accumulating, using an accumulator, a frequency modulation (FM) demodulated output corresponding to a color reference tone for each SECAM line; receiving, in a first leakage average filter, a first result from the accumulator; receiving, in a second leakage average filter, a second result from the accumulator; comparing the first result with the second result, wherein when there is change between a relative magnitude of the first leakage average filter and the second leakage average filter, a switch command is issued to the first leakage average filter and the second leakage average filter by a line decision block, and wherein the line decision block switches a stored value between the first leakage average filter and the second leakage average filter.

Preferably, the first leakage average filter and the second leakage average filter are interconnected to each other. In one embodiment, before a time n, a value of the first leakage average filter is greater than a value of the second leakage average filter, and at the time n, a value of the first leakage average filter is less than a value of the second leakage average filter. The method further comprises using a LUMA remove filter to filter a composite video signal; and operatively connecting a FM demodulator to the LUMA remove filter and the accumulator. The method further comprises using a horizontal and vertical synchronization block to take the composite video signal and generate a burst gate signal for the accumulator. In one embodiment, the analog television comprises a mobile handheld device.

Another embodiment provides an apparatus for soft-decision based PAL switch detection in an analog television, the apparatus comprising a burst locked oscillator (BLO) that receives a composite video signal as input and produces an instantaneous PAL switch signal for each line; a leakage average filter that receives the instantaneous PAL switch signal and filters noise from an output received from the BLO; and a switch detection block that is operatively connected to the leakage average filter and receives a filtered output from the leakage average filter, wherein the switch detection block makes a decision based on a sign of the filtered output of the leakage average filter. When the sign is a negative sign, then the switch detection block issues a PAL switch signal. The switch detection block simultaneously issues a signal to the leakage average filter to flip a sign of a stored values in the leakage average filter. In one embodiment, the analog television comprises a mobile handheld device.

Another embodiment provides a method of detecting a PAL switch based on a soft-decision in an analog television, the method comprising receiving, in a burst locked oscillator (BLO), a composite video signal as input; producing an instantaneous PAL switch signal for each line in the BLO; receiving, in a leakage average filter the instantaneous PAL switch signal and filtering noise from an output received from the BLO; receiving, in a switch detection block, a filtered output from the leakage average filter; and making a detection decision based on a sign of the filtered output of the leakage average filter. The method further comprises issuing a PAL switch signal when the sign is a negative sign. Additionally, the method further comprises simultaneously issuing a signal to the leakage average filter to flip a sign of stored values in the leakage average filter. In one embodiment, the analog television comprises a mobile handheld device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
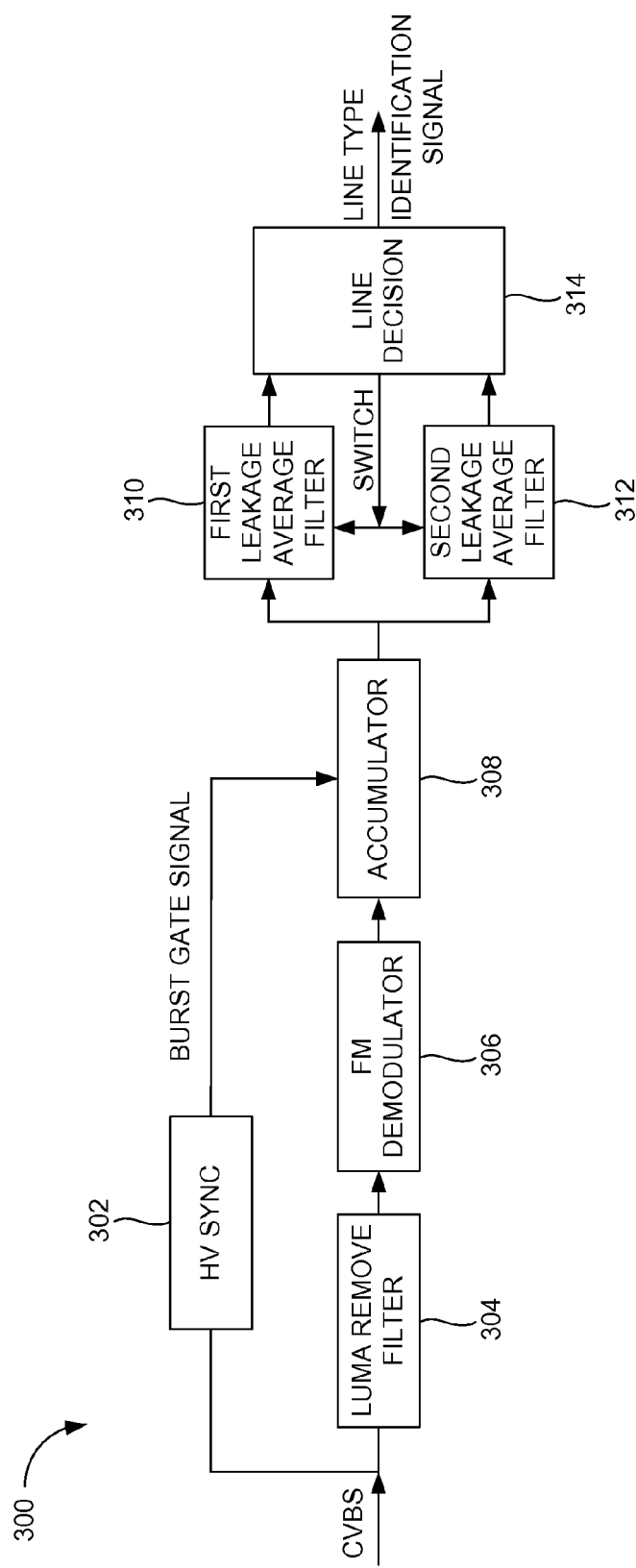
FIG. 1 illustrates a block diagram of SECAM line identification architecture according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for improved techniques for performing SECAM line identification and PAL switch detection. The embodiments herein achieve this by providing a SECAM line identification architecture that includes a first leakage average filter and a second leakage average filter that are connected to each other, and a line decision block that issues a switch command to the filters and switch the stored values if there is a change in a relative magnitude of the filters. Further, a soft-decision based PAL switch detection architecture includes a leakage average filter and a switch detection block that makes a decision based on the sign of output of a leakage average filter. If it is a negative sign, the switch detection block issues a PAL switch signal and at the same time, issues a signal to the leakage average filter to flip the sign of the stored value in the leakage average filter. Referring now to the drawings, and more particularly to FIGS. 1 through 6, where similar reference characters denote corresponding features consistently throughout the figures, there are shown preferred embodiments.

FIG. 1 illustrates a block diagram of SECAM line identification architecture 300 having a horizontal and vertical synchronization (HV SYNC) block 302, a LUMA remove filter 304, a FM demodulator 306, an accumulator 308, a first leakage average filter 310, a second leakage average filter 312, and a line decision block 314 according to an embodiment herein. The SECAM line may be at least one of a red line, or a blue line. A composite video signal (e.g., CVBS) is fed as an input to the HV SYNC block 302 and the LUMA remove filter 304. The HV SYNC block 302 receives the CVBS and generates a burst gate signal from the CVBS. The composite video signal (e.g., CVBS) is the format of an analog television signal before it is combined with a sound signal and modulated onto an RF carrier.

The HV SYNC block 302 generates the burst gate signal that indicates the locations of the reference color tone in each line. The LUMA remove filter 304 removes brightness information from the CVBS. The output of the LUMA remove filter 304 is sent to the FM demodulator 306. The accumulator 308 accumulates the output from the FM demodulator 306 corresponding to the color reference tone for each line. Then, the accumulator 308 sends the result alternately to the first leakage average filter 310 and the second leakage average filter 312 once every line. The line decision block 314 compares results from the first leakage average filter 310 and the second leakage average filter 312.

The HV SYNC block 302 may indicate the location of a reference color tone in each line (e.g., the red line, and the blue line). The burst gate signal is sent to the accumulator 308. The FM demodulator 306 is operatively connected to the LUMA remove filter 304 and the accumulator 308. The FM demodulator 306 demodulates the output received from the LUMA remove filter 304 and sends it to the accumulator 308. The accumulator 308 receives the FM demodulated output from the FM demodulator 306. The accumulator 308 accumulates the FM demodulated output corresponding to the color reference tone for each line (e.g., the red line, and the blue line).

The leakage average filters 310, 312 are operatively connected to the accumulator 308. The leakage average filters 310, 312 are also interconnected. The leakage average filters 310, 312 filter the noise from the received signals. The line decision block 314 is operatively connected to the leakage average filters 310, 312. The line compares the results of the leakage average filters 310, 312. If the leakage average filter 310 is larger than the leakage average filter 312, then a line identification signal is sent out indicating that the line associated with leakage average filter 310 is a red line, and the line associated with leakage average filter 312 is a blue line.

If the leakage average filter 310 is smaller than the leakage average filter 312, then a line identification signal is sent out indicating that the line associated with the leakage average filter 310 is a blue line, and the line associated with the leakage average filter 312 is red line. During the television (TV) reception, if there is change between the relative magnitude of the leakage average filters 310 and 312, the line decision block 314 issues a switch command to the leakage average filters 310 and 312, and switches the stored values between these two filters 310 and 312.

Figure 2:
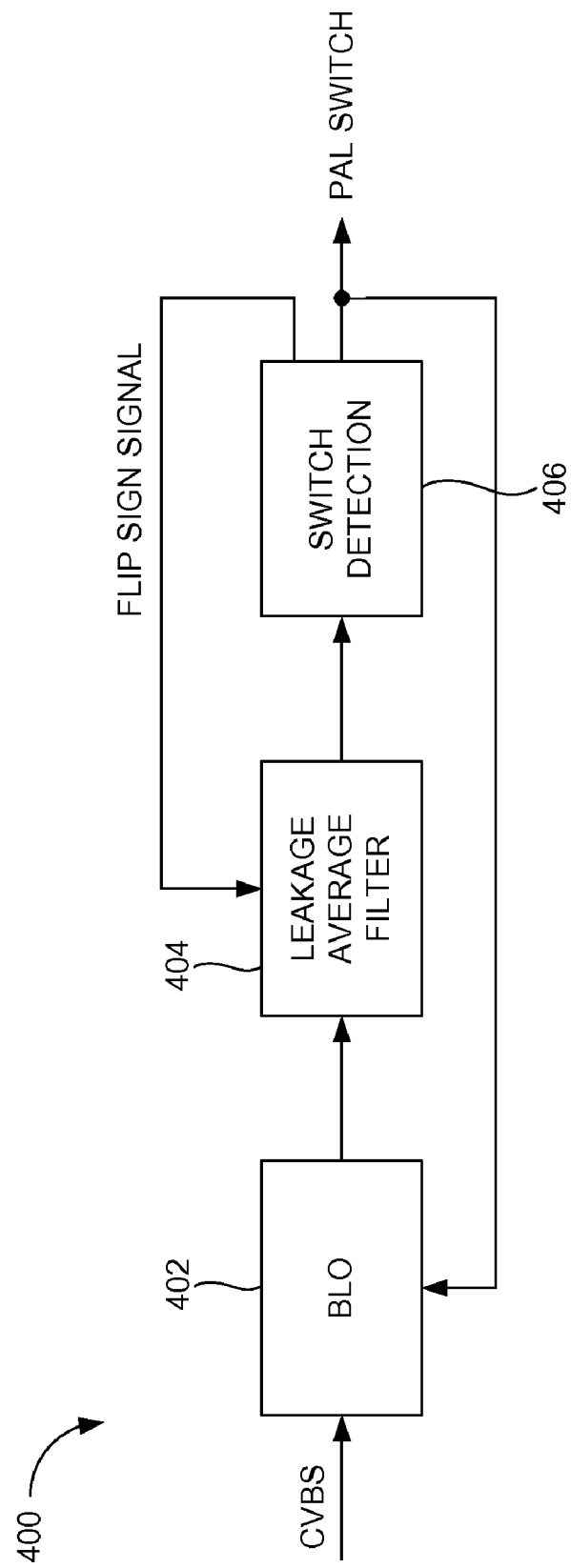
FIG. 2 illustrates a block diagram illustrating a soft-decision based PAL switch detection architecture according to an embodiment herein.

FIG. 2 illustrates a block diagram illustrating a soft-decision based PAL switch detection architecture 400 having a burst locked oscillator (BLO) 402, a leakage average filter 404, and a switch detection block 406 according to an embodiment herein. A composite video signal (CVBS) is fed as an input to the BLO 402. The BLO 402 produces an instantaneous PAL switch signal for each line (e.g., a red line, and a blue line). The leakage average filter 404 is operatively connected to the BLO 402. The leakage average filter 404 receives the instantaneous PAL switch signal. The leakage average filter 404 filters the noise from the output received from the BLO 402.

The switch detection block 406 is operatively connected to the leakage average filter 404. The switch detection block 406 receives the filtered output from the leakage average filter 404. The switch detection block 406 makes a decision based on the sign of the output of the leakage average filter 404. In one embodiment, if the sign is a negative sign, them the switch detection block 406 issues a PAL switch signal. Subsequently, the switch detection block 406 issues a signal to the leakage average filter 404 to flip the sign of the stored values in the leakage average filter 404.

Figure 3:
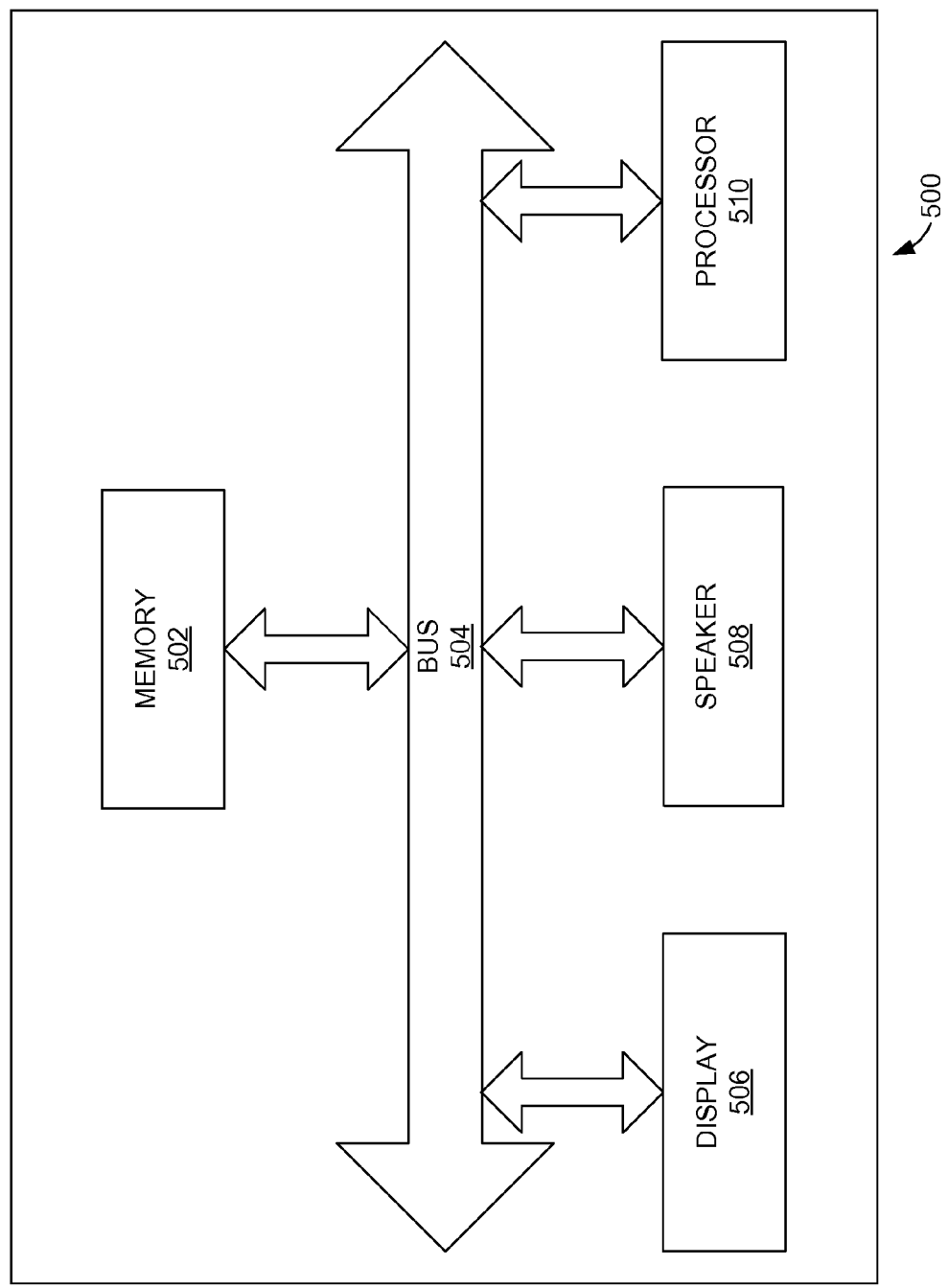
FIG. 3 illustrates an exploded view of a receiver according to an embodiment herein.

FIG. 3 illustrates an exploded view of a receiver 500 having a memory 502 having a computer set of instructions, a bus 504, a display 506, a speaker 508, and a processor 510 capable of processing a set of instructions to perform any one or more of the methodologies herein, according to an embodiment herein. The processor 510 may also enable analog content to be consumed in the form of output via one or more displays 506 or audio for output via speaker and/or earphones 508. The processor 510 may also carry out the methods described herein and in accordance with the embodiments herein. In one embodiment, the processor 510 performs SECAM line identification and a PAL switch detection on a composite video signal (CVBS) that includes modulated color information. The analog content may also be stored in the memory 502 for future processing or consumption.

A user of the receiver 500 may view this stored information on display 306. When the content is selected, the processor 510 may pass information. The content may be passed among functions within the receiver 500 using bus 504.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can comprise hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 4:
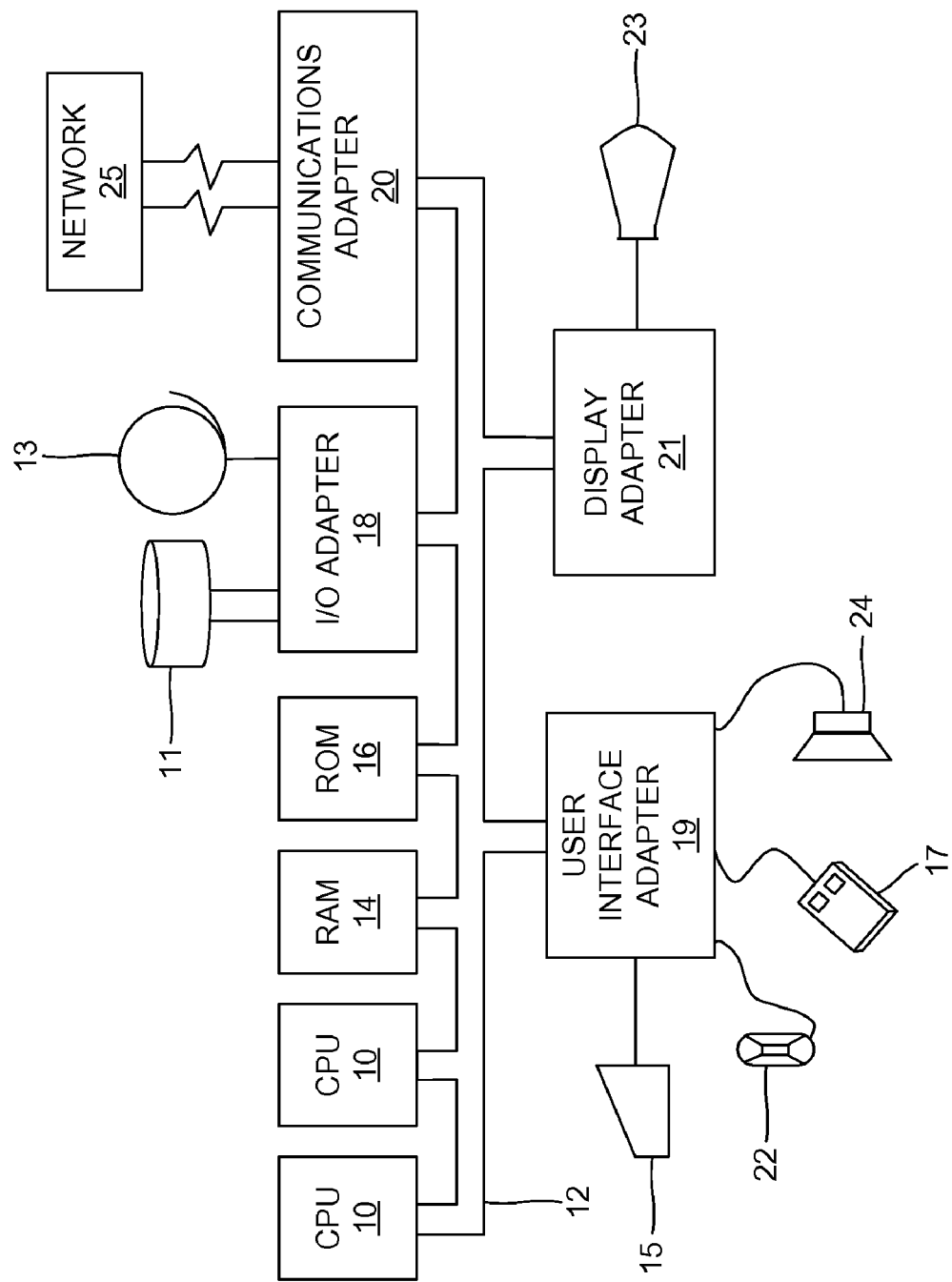
FIG. 4 illustrates a schematic diagram of a computer architecture used in accordance with the embodiments herein.

A representative hardware environment for practicing the embodiments herein is depicted in FIG. 4. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The SECAM line identification architecture 300 includes a first leakage average filter 310 and a second leakage average filter 312 that are connected to each other, and a line decision block 314. The line decision block issues a switch command to the filters 310, 312 and switch the stored values if there is a change in relative magnitude of the filters 310, 312. The soft-decision based PAL switch detection architecture 400 includes a leakage average filter 404 and a switch detection block 406 that makes a decision based on the sign of output of the leakage average filter 404. If it is a negative sign, then the switch detection block 406 issues a PAL switch signal and at the same time, issues a signal to the leakage average filter 404 to flip the sign of the stored value in the leakage average filter 404.

Figure 5:
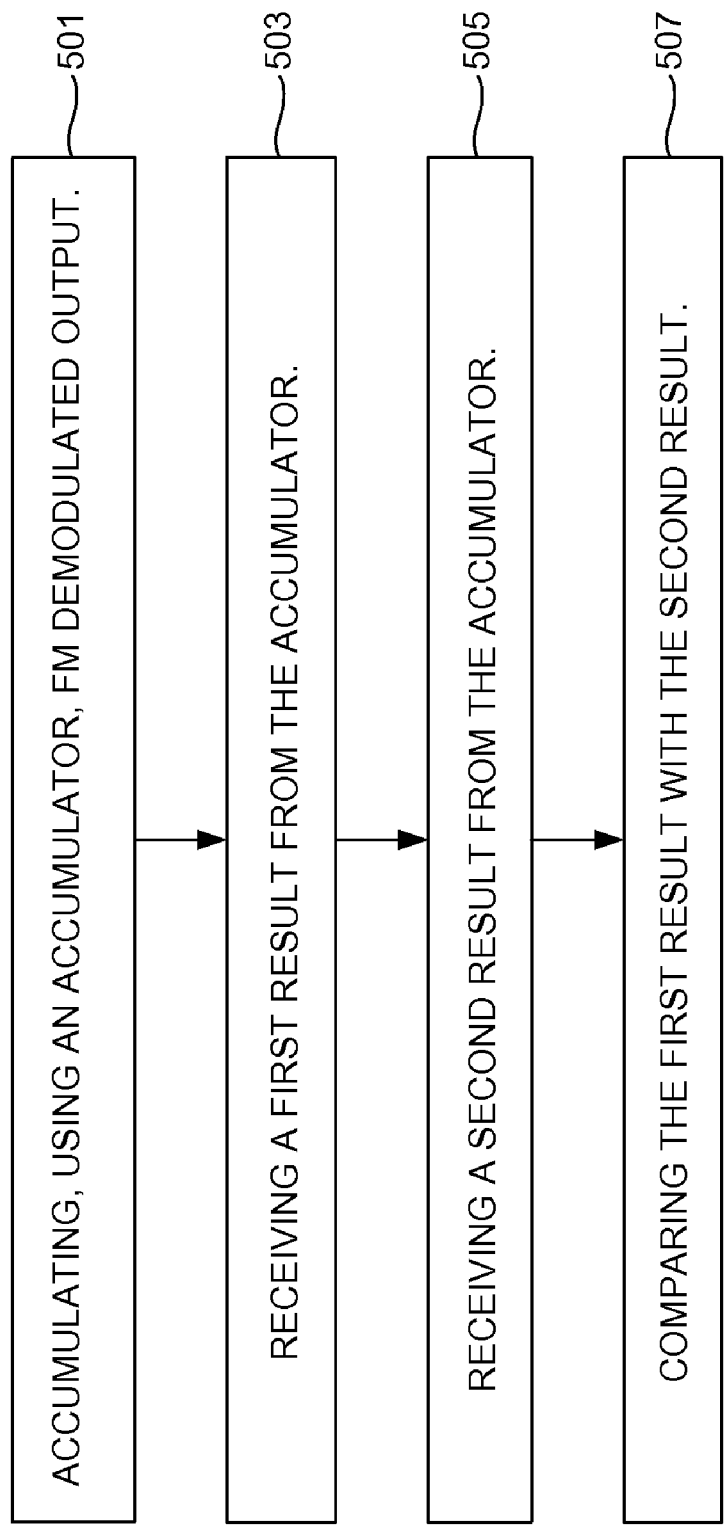
FIG. 5 is a flow diagram illustrating a method of identifying a SECAM line in an analog television receiver according to an embodiment herein.

FIG. 5, with reference to FIGS. 1 through 4, is a flow diagram illustrating a method of performing SECAM line identification in an analog television according to an embodiment herein, wherein the SECAM line comprises one of a red line and a blue line, the method comprising accumulating (501), using an accumulator 308, a frequency modulation (FM) demodulated output corresponding to a color reference tone for each SECAM line; receiving (503), in a first leakage average filter 310, a first result from the accumulator 308; receiving (505), in a second leakage average filter 312, a second result from the accumulator 308; comparing (507) the first result with the second result, wherein when there is change between a relative magnitude of the first leakage average filter 310 and the second leakage average filter 312, a switch command is issued to the first leakage average filter 310 and the second leakage average filter 312 by a line decision block 314, and wherein the line decision block 314 switches a stored value between the first leakage average filter 310 and the second leakage average filter 312.

Preferably, the first leakage average filter 310 and the second leakage average filter 312 are interconnected to each other. In one embodiment, before a time n, a value of the first leakage average filter 310 is greater than a value of the second leakage average filter 312, and at the time n, a value of first leakage average filter 310 is less than a value of the second leakage average filter 312. The method further comprises using a LUMA remove filter 304 to filter a composite video signal; and operatively connecting a FM demodulator 306 to the LUMA remove filter 304 and the accumulator 308. The method further comprises using a horizontal and vertical synchronization block 302 to take the composite video signal and generate a burst gate signal for the accumulator 308. In one embodiment, the analog television comprises a mobile handheld device 500.

Figure 6:
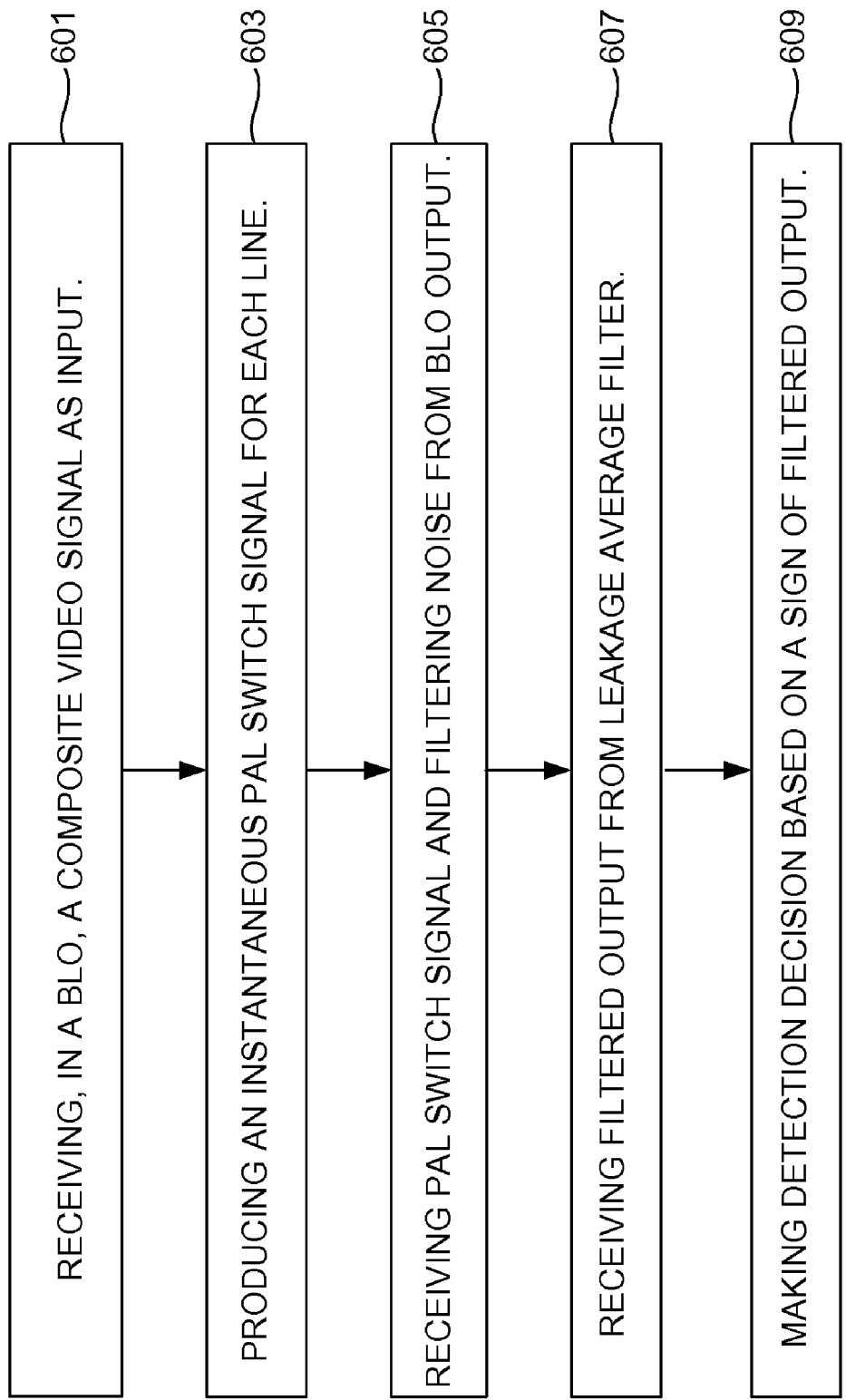
FIG. 6 is a flow diagram illustrating a method of detecting a PAL switch based on a soft-decision in an analog television receiver according to an embodiment herein.

FIG. 6, with reference to FIGS. 1 through 4, is a flow diagram illustrating a method of detecting a PAL switch based on a soft-decision in an analog television according to an embodiment herein, the method comprising receiving (601), in a burst locked oscillator (BLO) 402, a composite video signal as input; producing (603) an instantaneous PAL switch signal for each line in the BLO 402; receiving (605), in a leakage average filter 404 the instantaneous PAL switch signal and filtering noise from an output received from the BLO 402; receiving (607), in a switch detection block 406, a filtered output from the leakage average filter 404; and making (609) a detection decision based on a sign of the filtered output of the leakage average filter 404. The method further comprises issuing a PAL switch signal when the sign is a negative sign. Additionally, the method further comprises simultaneously issuing a signal to the leakage average filter 404 to flip a sign of stored values in the leakage average filter 404. In one embodiment, the analog television comprises a mobile handheld device 500.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. An apparatus for performing SECAM line identification in an analog television, wherein the SECAM line comprises one of a red line and a blue line, said apparatus comprising:

an accumulator that accumulates a frequency modulation (FM) demodulated output corresponding to a color reference tone for each said SECAM line;

a first leakage average filter operatively connected to said accumulator, wherein said first leakage average filter receives a first result from said accumulator;

a second leakage average filter operatively connected to said accumulator, wherein said second leakage average filter receives a second result from said accumulator; and a line decision block that compares said first result of said first leakage average filter and said second result of said second leakage average filter, wherein when there is a change between a relative magnitude of said first leakage average filter and said second leakage average filter, said line decision block issues a switch command to said first leakage average filter and said second leakage average filter, and switches a stored values between said first leakage average filter and said second leakage average filter.

2. The apparatus of claim 1, wherein said first leakage average filter and said second leakage average filter are interconnected to each other.

3. The apparatus of claim 2, wherein before a time n, a value of said first leakage average filter is greater than a value of said second leakage average filter, and at said time n, a value of said first leakage average filter is less than a value of said second leakage average filter.

4. The apparatus of claim 1, further comprising:
a LUMA remove filter that filters a composite video signal; and
a FM demodulator operatively connected to said LUMA remove filter and said accumulator.

5. The apparatus of claim 1, further comprising a horizontal and vertical synchronization block that takes said composite video signal and generates a burst gate signal for said accumulator.

6. The apparatus of claim 1, wherein said analog television comprises a mobile handheld device.

7. A method of performing SECAM line identification in an analog television, wherein the SECAM line comprises one of a red line and a blue line, said method comprising:
accumulating, using an accumulator, a frequency modulation (FM) demodulated output corresponding to a color reference tone for each said SECAM line;
receiving, in a first leakage average filter, a first result from said accumulator;
receiving, in a second leakage average filter, a second result from said accumulator;
comparing said first result with said second result,
wherein when there is change between a relative magnitude of said first leakage average filter and said second leakage average filter, a switch command is issued to said first leakage average filter and said second leakage average filter by a line decision block, and
wherein said line decision block switches a stored value between said first leakage average filter and said second leakage average filter.

8. The method of claim 7, wherein said first leakage average filter and said second leakage average filter are interconnected to each other.

9. The method of claim 7, wherein before a time n, a value of said first leakage average filter is greater than said second leakage average filter, and at said time n, a value of said first leakage average filter is less than said second leakage average filter.

10. The method of claim 7, further comprising:
using a LUMA remove filter to filter a composite video signal; and
operatively connecting a FM demodulator to said LUMA remove filter and said accumulator.

11. The method of claim 7, further comprising using a horizontal and vertical synchronization block to take said composite video signal and generate a burst gate signal for said accumulator.

12. The method of claim 7, wherein said analog television comprises a mobile handheld device.

13. An apparatus for soft-decision based PAL switch detection in an analog television, said apparatus comprising:
a burst locked oscillator (BLO) that receives a composite video signal as input and produces an instantaneous PAL switch signal for each line;
a leakage average filter that receives said instantaneous PAL switch signal and filters noise from an output received from said BLO; and
a switch detection block that is operatively connected to said leakage average filter and receives a filtered output from said leakage average filter, wherein said switch detection block makes a decision based on a sign of said filtered output of said leakage average filter.

14. The apparatus of claim 13, wherein when said sign is a negative sign, then said switch detection block issues a PAL switch signal.

15. The apparatus of claim 14, wherein said switch detection block simultaneously issues a signal to said leakage average filter to flip a sign of a stored values in said leakage average filter.

16. The apparatus of claim 13, wherein said analog television comprises a mobile handheld device.

17. A method of detecting a PAL switch based on a soft-decision in an analog television, said method comprising:
receiving, in a burst locked oscillator (BLO), a composite video signal as input;
producing an instantaneous PAL switch signal for each line in said BLO;
receiving, in a leakage average filter said instantaneous PAL switch signal and filtering noise from an output received from said BLO;
receiving, in a switch detection block, a filtered output from said leakage average filter; and
making a detection decision based on a sign of said filtered output of said leakage average filter.

18. The method of claim 17, further comprising issuing a PAL switch signal when said sign is a negative sign.

19. The method of claim 17, further comprising simultaneously issuing a signal to said leakage average filter to flip a sign of stored values in said leakage average filter.

20. The method of claim 17, wherein said analog television comprises a mobile handheld device.

* * * * *